United States Patent
Hoffmeister et al.

(10) Patent No.: US 10,121,471 B2
(45) Date of Patent: *Nov. 6, 2018

(54) LANGUAGE MODEL SPEECH ENDPOINTING

(71) Applicant: Amazon Technologies, Inc., Seattle, WA (US)

(72) Inventors: Bjorn Hoffmeister, Seattle, WA (US); Ariya Rastrow, Seatte, WA (US); Baiyang Liu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,811

(22) Filed: Jun. 29, 2015

(65) Prior Publication Data

US 2016/0379632 A1    Dec. 29, 2016

(51) Int. Cl.
| | |
|---|---|
| *G10L 15/22* | (2006.01) |
| *G10L 15/18* | (2013.01) |
| *G10L 15/26* | (2006.01) |
| *G10L 15/183* | (2013.01) |
| *G10L 25/93* | (2013.01) |
| *G10L 25/87* | (2013.01) |
| *G10L 25/78* | (2013.01) |

(52) U.S. Cl.
CPC ............. *G10L 15/22* (2013.01); *G10L 15/18* (2013.01); *G10L 15/183* (2013.01); *G10L 15/26* (2013.01); *G10L 25/87* (2013.01); *G10L 25/93* (2013.01); *G10L 2025/783* (2013.01)

(58) Field of Classification Search
CPC . G06F 17/289; G06F 17/2785; G10L 15/265; G10L 15/16; G10L 15/02; G10L 15/20; G10L 15/22; G10L 15/08; G10L 15/142; G10L 15/063; G10L 25/78; G10L 25/87; G10L 13/08
See application file for complete search history.

(56) References Cited

U.S. PATENT DOCUMENTS

| | | | | | |
|---|---|---|---|---|---|
| 4,319,085 | A | * | 3/1982 | Welch | G10L 25/87 704/237 |
| 4,336,421 | A | * | 6/1982 | Welch | G10L 15/05 704/243 |
| 4,481,593 | A | * | 11/1984 | Bahler | G10L 15/05 704/253 |

(Continued)

FOREIGN PATENT DOCUMENTS

GB    2346999 A    8/2000

OTHER PUBLICATIONS

Woo, et al. "Robust voice activity detection algorithm for estimating noise spectrum," Electronics Letters, vol. 36, No. 2, pp. 180-181, 2000.

(Continued)

*Primary Examiner* — Anne L Thomas-Homescu
(74) *Attorney, Agent, or Firm* — Pierce Atwood LLP

(57) ABSTRACT

An automatic speech recognition (ASR) system detects an endpoint of an utterance using the active hypotheses under consideration by a decoder. The ASR system calculates the amount of non-speech detected by a plurality of hypotheses and weights the non-speech duration by the probability of each hypotheses. When the aggregate weighted non-speech exceeds a threshold, an endpoint may be declared.

22 Claims, 10 Drawing Sheets

(56) References Cited

U.S. PATENT DOCUMENTS

| | | | |
|---|---|---|---|
| 4,882,757 A * | 11/1989 | Fisher | G10L 15/193 704/241 |
| 4,903,305 A * | 2/1990 | Gillick | G10L 15/063 704/240 |
| 5,555,350 A * | 9/1996 | Strauss | G06K 15/00 358/1.13 |
| 5,740,318 A * | 4/1998 | Naito | G10L 25/87 704/248 |
| 5,799,065 A * | 8/1998 | Junqua | G10L 15/08 379/216.01 |
| 5,822,730 A * | 10/1998 | Roth | G10L 15/08 704/255 |
| 6,092,044 A * | 7/2000 | Baker | G10L 15/063 704/254 |
| 6,163,768 A * | 12/2000 | Sherwood | G10L 15/063 704/235 |
| 6,167,377 A * | 12/2000 | Gillick | G10L 15/063 704/240 |
| 6,249,765 B1 * | 6/2001 | Adler | G10L 15/04 379/88.03 |
| 6,275,802 B1 * | 8/2001 | Aelten | G10L 15/08 704/242 |
| 6,374,219 B1 * | 4/2002 | Jiang | G10L 15/05 704/251 |
| 6,535,850 B1 * | 3/2003 | Bayya | G10L 15/07 704/239 |
| 6,594,630 B1 * | 7/2003 | Zlokarnik | G10L 15/26 704/256.5 |
| 6,600,874 B1 * | 7/2003 | Fujita | G11B 20/10 386/249 |
| 6,601,027 B1 * | 7/2003 | Wright | G06F 3/16 704/235 |
| 6,606,594 B1 * | 8/2003 | Sejnoha | G10L 15/05 704/250 |
| 6,826,528 B1 * | 11/2004 | Wu | G10L 25/78 704/204 |
| 6,839,669 B1 * | 1/2005 | Gould | G10L 15/22 704/246 |
| 6,873,953 B1 * | 3/2005 | Lennig | G10L 25/87 704/248 |
| 7,085,716 B1 * | 8/2006 | Even | G10L 15/22 704/235 |
| 7,120,582 B1 * | 10/2006 | Young | G10L 15/063 704/255 |
| 7,216,079 B1 * | 5/2007 | Barnard | G10L 15/063 704/244 |
| 7,277,853 B1 * | 10/2007 | Bou-Ghazale | G10L 25/87 704/248 |
| 9,437,186 B1 * | 9/2016 | Liu | G10L 15/05 |
| 9,886,968 B2 * | 2/2018 | Bou-Ghazale | G10L 25/84 |
| 2002/0007275 A1 * | 1/2002 | Goto | G10L 15/1822 704/251 |
| 2002/0147581 A1 * | 10/2002 | Shriberg | G10L 25/87 704/207 |
| 2002/0184017 A1 * | 12/2002 | Lee | G10L 25/87 704/236 |
| 2005/0080627 A1 * | 4/2005 | Hennebert | G10L 15/22 704/270 |
| 2005/0210402 A1 * | 9/2005 | Gunn | G06F 3/0236 715/773 |
| 2005/0256711 A1 * | 11/2005 | Lahti | G10L 25/87 704/253 |
| 2005/0264703 A1 * | 12/2005 | Aoki | G06F 17/30787 348/701 |
| 2006/0023901 A1 * | 2/2006 | Schott | H04M 3/4285 381/119 |
| 2006/0143010 A1 * | 6/2006 | Han | G10L 15/08 704/254 |
| 2006/0241948 A1 * | 10/2006 | Abrash | G10L 25/87 704/275 |
| 2006/0287859 A1 * | 12/2006 | Hetherington | G10L 25/87 704/260 |
| 2007/0150902 A1 * | 6/2007 | Meyer | H04M 3/4938 719/313 |
| 2007/0225982 A1 * | 9/2007 | Washio | G10L 15/22 704/257 |
| 2008/0004877 A1 * | 1/2008 | Tian | G10L 15/197 704/251 |
| 2008/0046406 A1 * | 2/2008 | Seide | G06F 17/30743 |
| 2008/0052073 A1 * | 2/2008 | Goto | G10L 15/06 704/251 |
| 2008/0077263 A1 * | 3/2008 | Yamane | G11B 27/031 700/94 |
| 2008/0118007 A1 * | 5/2008 | Fussell | H04L 47/10 375/340 |
| 2008/0124690 A1 * | 5/2008 | Redlich | G09B 7/00 434/236 |
| 2008/0127244 A1 * | 5/2008 | Zhang | H04N 5/147 725/32 |
| 2008/0154593 A1 * | 6/2008 | Da Palma | G10L 15/30 704/235 |
| 2008/0154594 A1 * | 6/2008 | Itoh | G10L 15/04 704/235 |
| 2008/0195385 A1 * | 8/2008 | Pereg | G10L 17/26 704/231 |
| 2009/0086934 A1 * | 4/2009 | Thomas | G10L 15/07 379/88.01 |
| 2009/0112599 A1 * | 4/2009 | Ljolje | G10L 15/142 704/270 |
| 2009/0198490 A1 * | 8/2009 | Eckhart | G10L 25/87 704/215 |
| 2010/0031143 A1 * | 2/2010 | Rao | G06F 3/0237 715/261 |
| 2010/0057453 A1 * | 3/2010 | Valsan | G10L 25/78 704/232 |
| 2010/0088094 A1 * | 4/2010 | Wang | G10L 25/78 704/233 |
| 2010/0180202 A1 * | 7/2010 | Del Valle Lopez | G06F 3/048 715/728 |
| 2010/0191524 A1 * | 7/2010 | Washio | G10L 25/78 704/207 |
| 2011/0040554 A1 * | 2/2011 | Audhkhasi | G09B 19/04 704/9 |
| 2011/0172989 A1 * | 7/2011 | Moraes | G06Q 10/107 704/9 |
| 2011/0301728 A1 * | 12/2011 | Hamilton | G11B 27/034 700/94 |
| 2011/0301950 A1 * | 12/2011 | Ouchi | G10L 15/28 704/231 |
| 2012/0072211 A1 * | 3/2012 | Edgington | G10L 15/04 704/231 |
| 2012/0106756 A1 * | 5/2012 | Konchitsky | H04R 3/005 381/94.1 |
| 2012/0114140 A1 * | 5/2012 | Konchitsky | H04R 3/005 381/94.1 |
| 2012/0116765 A1 | 5/2012 | Hanazawa et al. | |
| 2012/0221330 A1 * | 8/2012 | Thambiratnam | G10L 25/84 704/235 |
| 2013/0132089 A1 * | 5/2013 | Fanty | G10L 21/00 704/270 |
| 2013/0325475 A1 * | 12/2013 | Chung | G10L 15/05 704/253 |
| 2013/0332159 A1 * | 12/2013 | Federighi | G06F 1/206 704/235 |
| 2014/0249812 A1 * | 9/2014 | Bou-Ghazale | G10L 25/84 704/233 |
| 2015/0039304 A1 * | 2/2015 | Wein | G10L 25/78 704/233 |
| 2015/0081271 A1 * | 3/2015 | Sumita | G10L 15/00 704/2 |
| 2015/0169279 A1 * | 6/2015 | Duga | G09B 19/04 700/94 |
| 2015/0206544 A1 * | 7/2015 | Carter | G10L 25/78 704/235 |
| 2015/0220507 A1 * | 8/2015 | Mohajer | H04L 51/22 704/9 |

(56) References Cited

U.S. PATENT DOCUMENTS

2016/0217793 A1* 7/2016 Gorodetski ............. G10L 17/04
2016/0358598 A1* 12/2016 Williams ................ G10L 15/04

OTHER PUBLICATIONS

Chengalvarayan. "Robust energy normalization using speech/nonspeech discriminator for german connected digit recognition," in Sixth European Conference on Speech Communication and Technology, 1999.

ITU. "Silence compression scheme for g. 729 optimized for terminals conforming to recommendation v. 70," ITU-T Recommendation G, vol. 729, 1996.

Ramirez, et al. "Efficient voice activity detection algorithms using long-term speech information," Speech communication, vol. 42, No. 3, pp. 271-287, 2004.

Thomas, et al. "Acoustic and Data-driven Features for Robust Speech Activity Detection." in Interspeech. 2012.

Ryant, et al. "Speech activity detection on youtube using deep neural networks." in Interspeech, 2013, pp. 728-731.

Hughes, et al. "Recurrent neural networks for voice activity detection," in Acoustics, Speech and Signal Processing (ICASSP), 2013 IEEE International Conference on. IEEE, 2013, pp. 7378-7382.

Stuker, et al. "The isl 2007 english speech transcription system for european parliament speeches." in Interspeech, 2007, pp. 2609-2612.

Raux, et al. "Optimizing endpointing thresholds using dialogue features in a spoken dialogue system," in Proceedings of the 9th SIGdial Workshop on Discourse and Dialogue. Association for Computational Linguistics, 2008, pp. 1-10.

Edlund, et al. "Utterance segmentation and turn-taking in spoken dialogue systems," Sprachtechnologie, mobile Kommunikation and Iinguistische Ressourcen, pp. 576-587, 2005.

Ferrer, et al. "Is the speaker done yet? faster and more accurate end-of-utterance detection using prosody," in Seventh International Conference on Spoken Language Processing, 2002.

Hinton et al. "Deep neural networks for acoustic modeling in speech recognition: The shared views of four research groups," Signal Processing Magazine, IEEE, vol. 29, No. 6, pp. 82-97, 2012.

International Search Report, dated Oct. 10, 2016, Applicant: Amazon Technologies, Inc., 13 pages.

International Preliminary Report on Patentability and Written Opinion, dated Jan. 11, 2018, Applicant Amazon Technologies, Inc., 9 pgs.

Liu et al., "Accurate Endpointing with Expected Pause Duration", (Sep. 6, 2015), URL:http://www.isca-speech.org/archive/interspeech_2015/papers/i15_2912.pdf.

* cited by examiner

FIG. 7

702 ⌒ What is the weather [end]

704 ⌒ What is the weather in Seattle [end]

706 ⌒ What is the weather in Chicago [end]

708 ⌒ What is the weather in Detroit [end]

* * *

712 ⌒ What is the weather in Seattle in winter [end]

714 ⌒ What is the weather in Seattle in summer [end]

***

722 ⌒ What is the weather in Seattle in January [end]

***

732 ⌒ What is the weather in Seattle on January twentieth [end]

***

742 ⌒ What is the weather in Seattle tomorrow [end]

744 ⌒ What is the weather in Seattle tomorrow afternoon [end]

LANGUAGE MODEL SPEECH ENDPOINTING

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 7 illustrates a number of hypotheses that may be considered by a speech recognition system.

DETAILED DESCRIPTION

Figure 1:
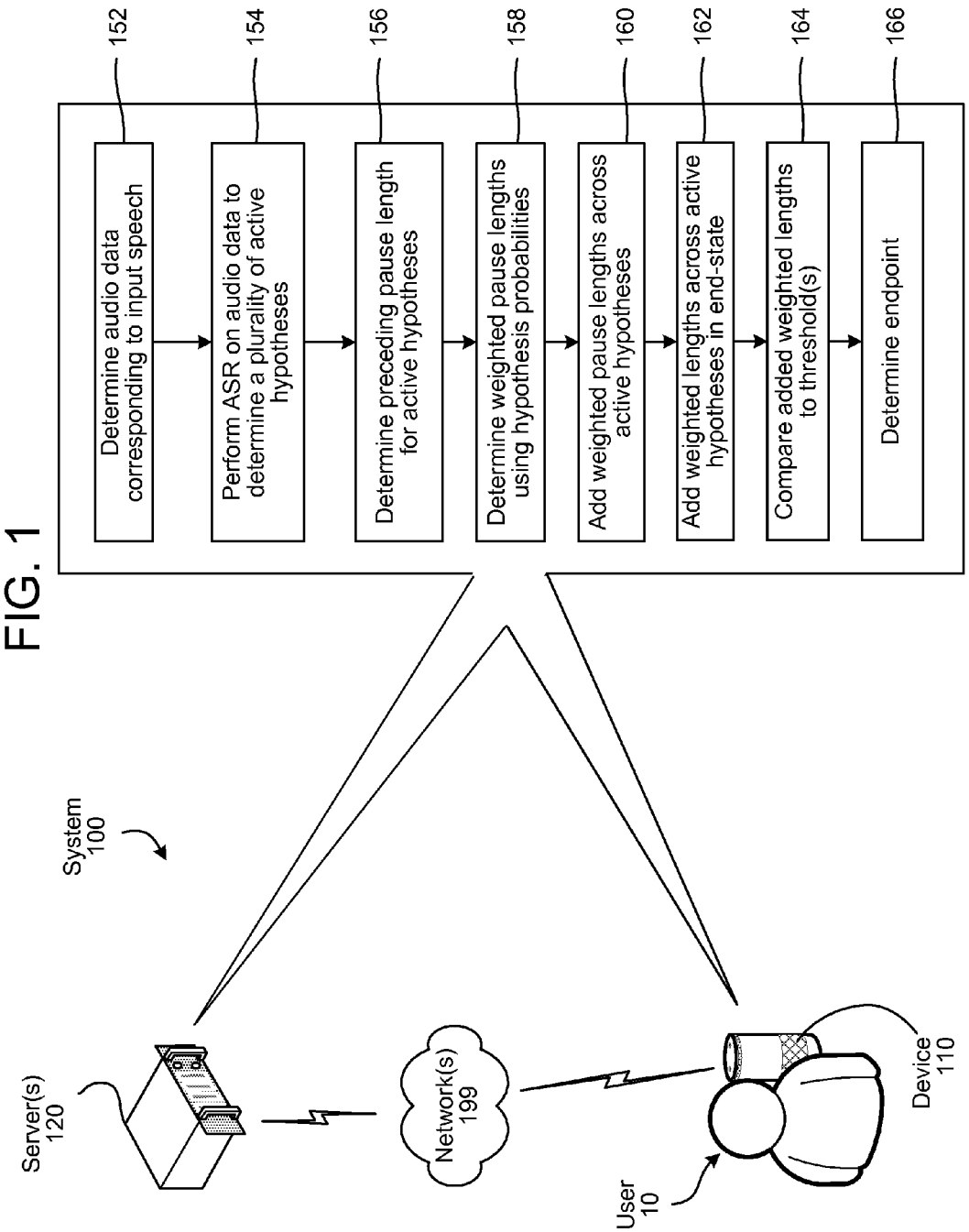
FIG. 1 illustrates a system for automatic speech recognition (ASR) according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. A typical such distributed environment may involve a local device having one or more microphones being configured to capture sounds from a user speaking and convert those sounds into an audio signal. The audio signal may then be sent to a downstream remote device for further processing, such as converting the audio signal into an ultimate command. The command may then be executed by a combination of remote and local devices depending on the command itself.

As part of a distributed speech processing system, a local device may be configured to continuously send all detected audio to the remote device. There are several drawbacks to such an approach. One drawback is that such communications would require significant bandwidth and networking resources. Another drawback to such an approach is that privacy concerns may make it undesirable for a local device to send all captured audio to a remote device. A still further drawback is that a remote device may waste significant computing resources processing all incoming audio when no commands are being issued in the majority of the audio.

To account for these problems, a local device may be configured to only activate upon a user speaking a particular waking command to wake the local device so the user may speak a further command. The waking command (which may be referred to as a wakeword), may include an indication for the system to perform further processing. The local device may continually listen for the wakeword and may disregard any audio detected that does not include the wakeword. Typically, systems are configured to detect a wakeword, and then process any subsequent audio following the wakeword (plus perhaps a fixed, but short amount of audio pre-wakeword) to detect any commands in the subsequent audio. As an example, a wakeword may include a name by which a user refers to a device. Thus, if the device was named "Alexa," and the wakeword was "Alexa," a user may command a voice controlled device to play music by saying "Alexa, play some music." The device, recognizing the wakeword "Alexa" would understand the subsequent audio (in this example, "play some music") to include a command of some sort and would perform speech processing on that audio to determine what the command is for execution. Provided services/commands may include performing actions or activities, rendering media, obtaining and/or providing information, providing information via generated or synthesized speech via a local device, initiating Internet-based services on behalf of the user, and so forth.

To determine when to stop processing audio data, a process called endpointing may be used. Traditional endpointing techniques typically rely on pauses detected in the audio data, however such techniques may be imprecise and may lead to errors, particularly when a user pauses speaking in mid-sentence, only to resume shortly thereafter. Current systems may determine an endpoint in the pause, thus resulting in cessation of speech processing at the incorrect time.

Offered is a system to correct this problem where hypotheses are considered when determining a likely utterance endpoint.

FIG. 1 illustrates a system such as the one described above. As illustrated, a system 100 may include a speech controlled device 110 at the location of a user 10. The device 110 may be connected over a network 199 to one or more server(s) 120. The system 100 may be a distributed speech processing system where the device 110 captures audio spoken by the user 10 and the server(s) perform speech processing on the audio as described below in reference to FIG. 2. As shown in FIG. 1, the system may determine (152) audio data corresponding to input speech and may perform (154) ASR on the audio data to determine a plurality of active hypotheses being considered by a decoder/speech recognition engine of the system. The system may also determine (156) pause lengths for each active hypothesis. The system may determine the pause length/duration on an ongoing basis, for example tracking the amount of non-speech immediately preceding a particular node in a lattice. Alternatively, the system may check, at a particular time during the processing, the amount of non-speech immediately preceding the end of each active hypothesis. The pause length may be determined, for example, by a number of non-speech frames immediately preceding the end of each hypothesis. The system may then determine (158) weighted pause lengths by multiplying the weighted pause lengths of each active hypothesis by the respective hypothesis' ASR probability as determined by the speech recognition engine. The system may then add (160) the weighted pause lengths of the active hypotheses together to arrive at an expected pause duration. The system may also add (162) the weighted pause lengths of the active hypotheses in an end state to arrive at an expected pause duration at end state. The system may then compare (164) the cumulative weighted pause lengths to one or more thresholds. For example the system may compare the expected pause duration to a first threshold and the expected pause duration at end state to a second threshold. The system may then determine (166) an endpoint when the expected pause durations exceed their respective thresholds. The determination of the endpoint is thus an estimation that a spoken command has concluded, where the confidence of the estimation is based on the expected pause duration. Hence the endpoint being determined when the expected pause duration exceeds a threshold. The system thus may designate a likely endpoint based on the amount of pause or non-speech seen by one or more ASR hypotheses. When a likely endpoint is determined, the system may perform other operations on the received audio, for example NLP and/or other command processing.

Figure 2:
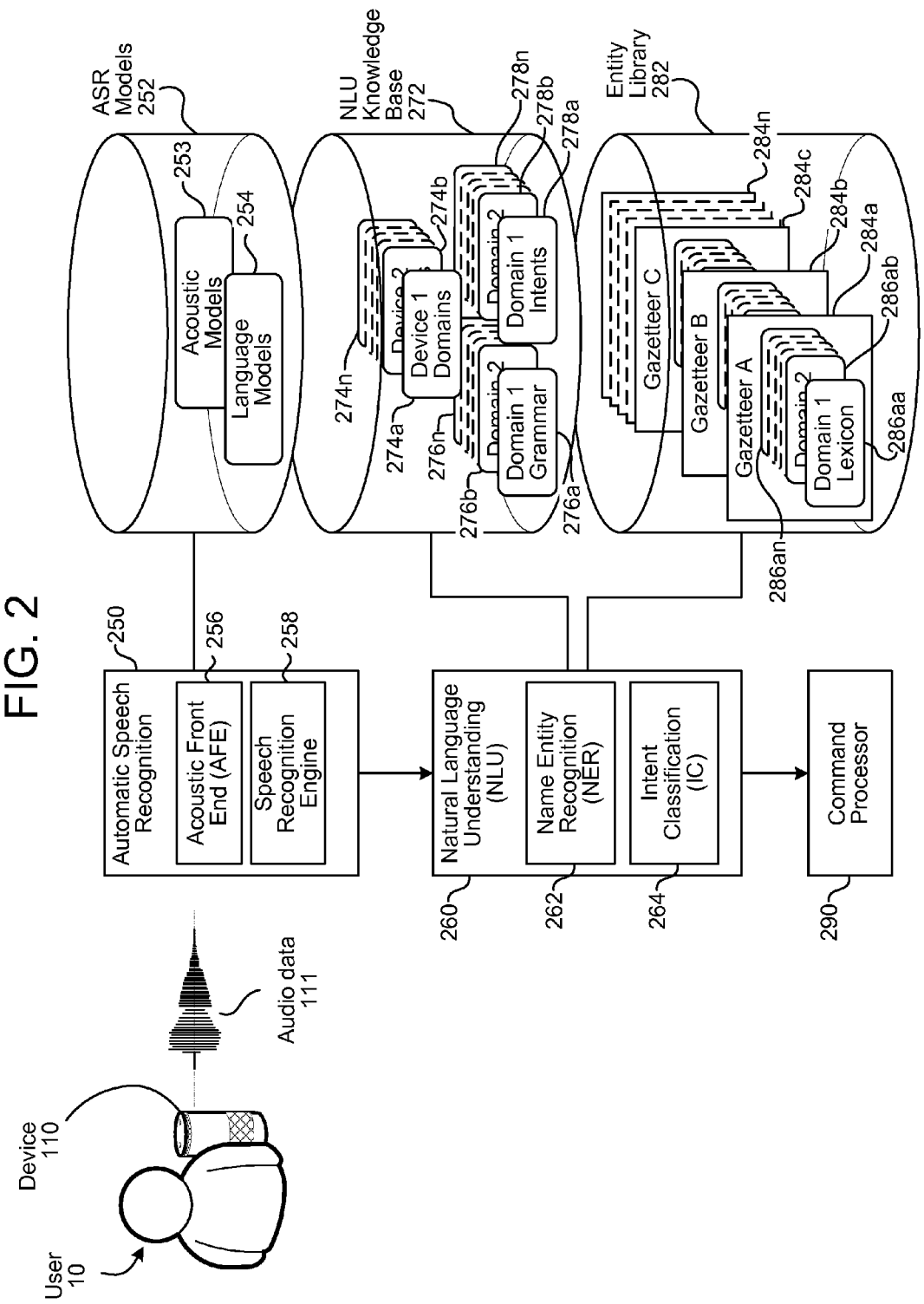
FIG. 2 is a conceptual diagram of how a spoken utterance may be processed according to embodiments of the present disclosure.

The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. The system may include a device 110, which may be a general purpose device (such as a mobile phone, tablet, etc.) or a specific purposes device such as an audio device configured to play music. Although the teachings below apply to many different types of devices 110, for present purposes operation of the system may be illustrated using the example of an audio device 110. The audio device 110 may include a plurality of applications that are configured to work in conjunction with other elements of the audio device 110 to provide services and functionality. The applications may include media playback services such as music players. Other services or operations performed or provided by the applications may include, as examples, requesting and consuming entertainment (e.g., gaming, finding and playing music, movies or other content, etc.), personal management (e.g., calendaring, note taking, etc.), online shopping, financial transactions, database inquiries, and so forth. In some embodiments, the applications may be pre-installed on the audio device 110, and may implement core functionality of the audio device 110. In other embodiments, one or more of the applications may be installed by the user 10, or otherwise installed after the audio device 110 has been initialized by the user 10, and may implement additional or customized functionality as desired by the user 10.

An audio capture component, such as a microphone of the audio device 110, captures audio corresponding to a spoken utterance. Details for capturing the spoken utterance, such as determining the beginning and/or end of the utterance and configuring an audio signal corresponding to the utterance, is discussed below. An audio signal/audio data 111 comprising a representation of the utterance may be sent to an ASR component 250. The ASR component 250 may be local to the audio device 110 and/or located on a remote server 120. The ASR component 250 converts the audio into text. The ASR component 250 thus transcribes audio data into text data representing the words of the speech contained in the audio data. The text data may then be used by other downstream components for various purposes, such as executing system commands, inputting data, etc. The downstream component may be any number of components or applications that operate on ASR output. Although many such downstream applications are envisioned for these techniques, for purposes of illustration this description will use an NLU process and application as the NLU process illustrates the benefits of early ASR output as described below. For example, the NLU process may take ASR output and determine, for example, the actions (sometimes referred to as a command, "application response" or "app response") based on the recognized speech of the early ASR output.

A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model or dialog-based interactive voice response (IVR) system)). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine/decoder 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. The AFE 256 may be located on a device 110 or on a server 120. If on a device 110, the device may send the output of the AFE, such as the feature vectors, over a network 199 to the server 120 for further processing.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the appliance 110 may process audio data into feature vectors and transmit that information to a server across a network 199 for ASR processing. Feature vectors may arrive at the server encoded, in which case they may be decoded prior to processing by the processor executing the speech recognition engine 258. A sliding window technique may be used to determine feature vectors for processing. For example, each frame of audio may be 25 milliseconds (ms) long, but a next audio frame starts 10 ms from the end of the previous frame. Thus audio data from a certain point in time may appear in multiple frames. A fast-Fourier transform (FFT) may be applied to obtain a short-term magnitude spectrum corresponding to the frame. Then feature values for the frame data may be determined, for example by applying filter banks to obtain feature values, which may then be included in a feature vector corresponding to the audio frame. One or more feature vectors may correspond to a single frame. Other techniques for obtaining feature vectors may also be used.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on audio device 110 or in a music playing appliance, configured to execute a music playing command. The server may configure data corresponding to the command included in the utterance (which may be referred to as utterance command data). Depending on system configuration the utterance command data may be created by and output from the NLU 260, in which case the command may be executed by the command processor 290 (located either on the server 120, device 110, or located elsewhere), or the utterance command data may be created by and output from the command processor 290, in which case the utterance command data may be sent to a downstream component.

Turning now to the identification of speech within the audio data 111, for example the system 100 may use various techniques for determining the beginning and end of speech to be processed. For purposes of illustration, in system 100 the beginpoint of speech is described as determined by the device 110 and the endpoint of the speech is described as determined by the server 120 (after receipt of corresponding audio data from the device 110), but different components may perform the beginpointing/endpointing without diverging from the present disclosure.

Once speech is detected in the audio received by the device 110, the device may perform wakeword detection to determine when a user intends to speak a command to the device 110. As noted above, a wakeword is a special word that the device 110 is configured to recognize among the various audio inputs detected by the device 110. The wakeword is thus typically associated with a command to be executed by the device 110 and/or overall system 100. Following detection of the wakeword the device 110 may send audio data corresponding to the utterance (which may include the wakeword itself) to the server(s) 120. The server(s) 120 may then perform speech processing on the audio data 111 until an endpoint is detected (discussed below) and may also and execute any resulting command included in the utterance.

To determine the beginning or end of an audio command, a number of techniques may be used. In one embodiment the system may determine pauses in spoken words and may interpret those pauses as potential breaks in a conversation. Thus, while the discussion herein may refer to determining or declaring an endpoint, what the system does is estimate that a spoken command has ended (i.e., reached an endpoint) based on the various considerations described herein. Breaks in a conversation may be considered as breaks between utterances and thus considered the beginning (beginpoint) or end (endpoint), of an utterance. The beginning/end of an utterance may also be detected using speech/voice characteristics. Other techniques may also be used to determine the beginning of an utterance (also called beginpointing) or end of an utterance (endpointing). Beginpointing/endpointing may be based, for example, on the number of silence/non-speech audio frames, for instance the number of consecutive silence/non-speech frames. For example, some systems may employ energy based or acoustic model based voice activity detection (VAD) techniques. Such techniques may determine whether speech is present in an audio input based on various quantitative aspects of the audio input, such as the spectral slope between one or more frames of the audio input; the energy levels (such as a volume, intensity, amplitude, etc.) of the audio input in one or more spectral bands; zero-crossing rate; the signal-to-noise ratios of the audio input in one or more spectral bands; or other quantitative aspects. These factors may be compared to one or more thresholds to determine if an break in speech has occurred that qualifies as a beginpoint/endpoint. Such thresholds may be set according to user input, or may be set by a device. In some embodiments, the beginpointing/endpointing may be further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored. The beginpointing/endpointing may compare the energy level to the energy level threshold (and optionally to the threshold duration) to determine whether the energy level threshold is met.

In certain embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence/non-speech. Still other techniques may be used to determine whether speech begins/ends in the input audio data.

Various machine learning techniques may be used to determine a beginning of an utterance or an end of an utterance as discussed above. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used during training.

Training examples of sample utterance audio along with labeled ground truths about utterance beginnings, utterance conclusions, existence/lengths of pauses, etc. may be used to training machine learning models for use at runtime to make such determinations. Further, tags representing the length of pauses and semantic content of potential utterances may be identified and inserted in the training data for use when training a model. During run time processing, the model and sematic tags representing the length of pauses in speech may be used to determine, for example, the likelihood that the system should await more speech before determining the end of an utterance. Depending on the determination, the number of frames of non-speech that may be processed before the beginning of the utterance is established is adjusted. The number of non-speech frames prior to detected speech may determine when the device/system determines the beginning or end of an utterance.

The length of a pause sufficient to qualify the pause as a beginpoint/endpoint may depend on the identity of the speaker. If the system is configured to perform speaker identification (techniques for which are known in the art), the system may identify the speaker and adjust the pause length sufficient to determine an endpoint accordingly. The system may also be configured to learn pause tendencies of different speakers and to adjust its endpointing processing accordingly. For example, during system training/enrollment, a speaker's pause tendencies between utterances or between topics may be recorded and used to train the endpointing processing of the system. Such tendencies may also be recorded at runtime and used to further adjust the system. Different pause lengths may also be configured for different spoken languages as the pause length may vary depending on the language spoken (for example pauses in conversational English may be different from pauses in conversational Spanish). The begin/end of an utterance may also be determined by various characteristics of the speech including pitch, prosody, volume, rhythm, stress, intonation, cepstrum, etc. of the speech which may be determined by audio and/or speech processing components of the device. For example, a rising or falling tone of a voice may indicate a new utterance, the end of a command, etc. The system may train on voice characteristics (which may or may not be also tied to speaker identity) that indicate when an utterance ends, and thus when an end of the speech should be marked by the system. These techniques may be used to modify/customize the language models discussed above, such that expected pauses in the language model(s) may be based on an identity of a speaker.

Using various of the techniques described above, the beginpointing/endpointing may determine a confidence level whose value corresponds to a likelihood that the location of the point in question (i.e., the point in the audio data at which the beginpointing/endpointing occurs) represents the start/end of an utterance/command. The confidence score may depend on factors such as the technique used to determine the marker, the length of the pause, the speaker identity, etc. For example, if the confidence level satisfies a confidence level threshold, it may be determined that a detected silence is sufficient (e.g., the length of a pause in the speech exceeds a threshold), that speech is present in the audio input, and that an utterance begin/end may be marked. However, if the confidence level does not satisfy the confidence level the system may determine that there is no speech in the audio input.

Once a wakeword/beginpoint is detected, the device 110 may begin sending audio data to the server 120. The server 120 will continue speech processing on the audio data until an endpoint is detected. The audio data from the beginpoint to the endpoint is thus considered by the system 100 when performing the speech processing for the utterance.

Traditionally, the process for endpointing has been similar to the process for beginpointing as discussed above. One difference between endpointing and beginpointing, however, is that during endpointing, the system has some knowledge of the contents of the utterance that is being endpointed. Thus, while beginpointing may sometimes occur when there is no prior speech, endpointing occurs when there is prior speech, namely the speech of the utterance whose endpoint is being detected.

Further, one drawback to current VAD or other techniques that rely simply on pause length, is that they have difficulty distinguishing between mid-utterance pauses, and pauses that truly indicate the end of an utterance. Further, current systems may encounter difficulty in noisy environments where separating speech from noise impacts proper pause detection.

Offered a speech processing system that makes use of the content of speech when determining an endpoint of the utterance. The present system considers the content of the speech using information from acoustic models and language models when determining an endpoint. This system improves on current VAD or other techniques that rely simply on pause length and thus improves the system's ability to distinguish between mid-utterance pauses and end of utterance pauses. An endpoint detector may determine an endpoint based on different hypotheses determined by the speech recognition engine 258. Based on an individual hypothesis, the system determines an expected pause length over multiple active speech hypotheses and whether the actual pause length matches the averaged expected pause length for purposes of declaring an endpoint. By considering active hypotheses, which include a sentence end, the system can more robustly distinguish between expected within and end-of sentence pause duration.

To understanding the incorporate of acoustic model and language model data during endpointing, some further data is provided below regarding detailed operation of the speech recognition engine 258.

As noted above, during speech recognition, an ASR module 250/speech recognition engine 258 may utilize acoustic models 253 to determine possible phonemes or other phonetic units that match the incoming audio data feature vectors. The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 3:
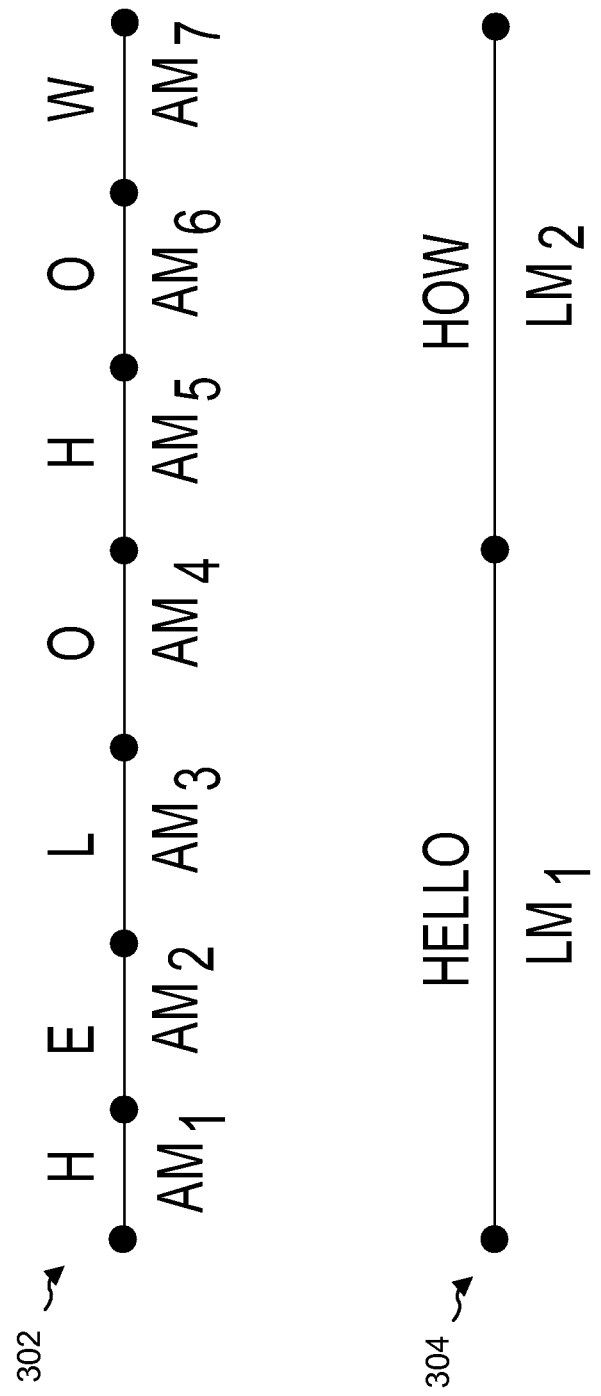
FIG. 3 illustrates phoneme processing and word processing according to one aspect of the present disclosure.

FIG. 3 illustrates the relationship between acoustic modeling and language modeling. As illustrated, each processed phoneme included in the path 302 is associated with an acoustic model score $AM_1$ through $AM_7$. The language model is then applied to associate each word in the path 304 with a language model score $LM_1$ or $LM_2$.

As part of the language modeling (or in other phases of the ASR processing) the speech recognition engine 258 may, to save computational resources, prune and discard low recognition score states or paths that have little likelihood of corresponding to the spoken utterance, either due to low recognition score pursuant to the language model, or for other reasons. Such pruned paths/hypotheses are considered inactive. Active hypotheses are hypotheses that are still under consideration by the speech recognition engine 258. Thus, active hypotheses may have a confidence score that is above a certain threshold as they have thusfar avoided pruning. As ASR processing continues, at different points in the ASR processing different hypotheses may be considered "active" as other hypotheses are added and/or removed from active consideration based on incoming audio data and acoustic model processing. Further, during the ASR processing the speech recognition engine 258 may iteratively perform additional processing passes on previously processed utterance portions. Later passes may incorporate results of earlier passes to refine and improve results. Paths which are being currently processed and considered as a potential output of the system are thus considered active hypotheses.

Figure 4:
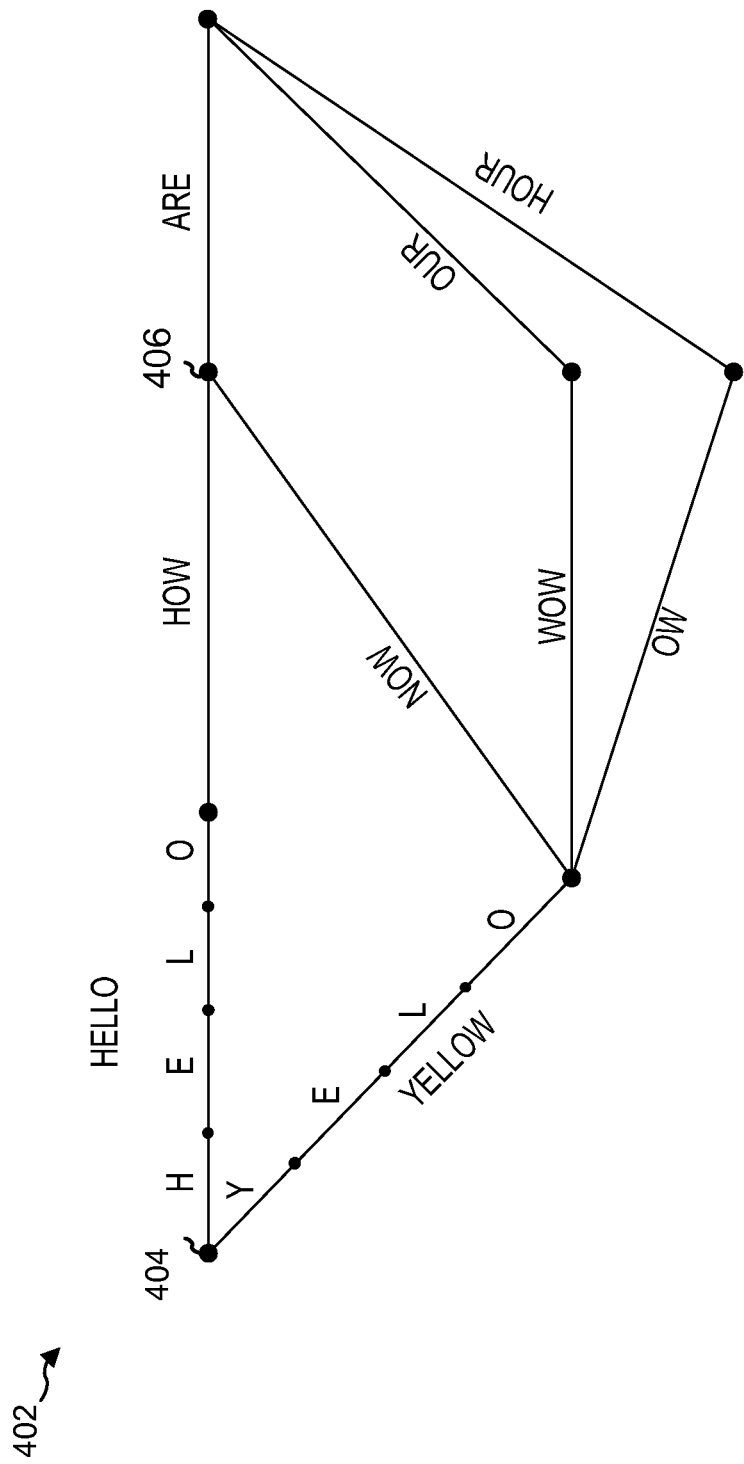
FIG. 4 illustrates a speech recognition lattice according to one aspect of the present disclosure.

The speech recognition engine 258 may combine potential paths into a lattice representing speech recognition results. A sample lattice is shown in FIG. 4. The lattice 402 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 404 and node 406 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 258 as the ASR result for the associated feature vectors.

Figure 5:
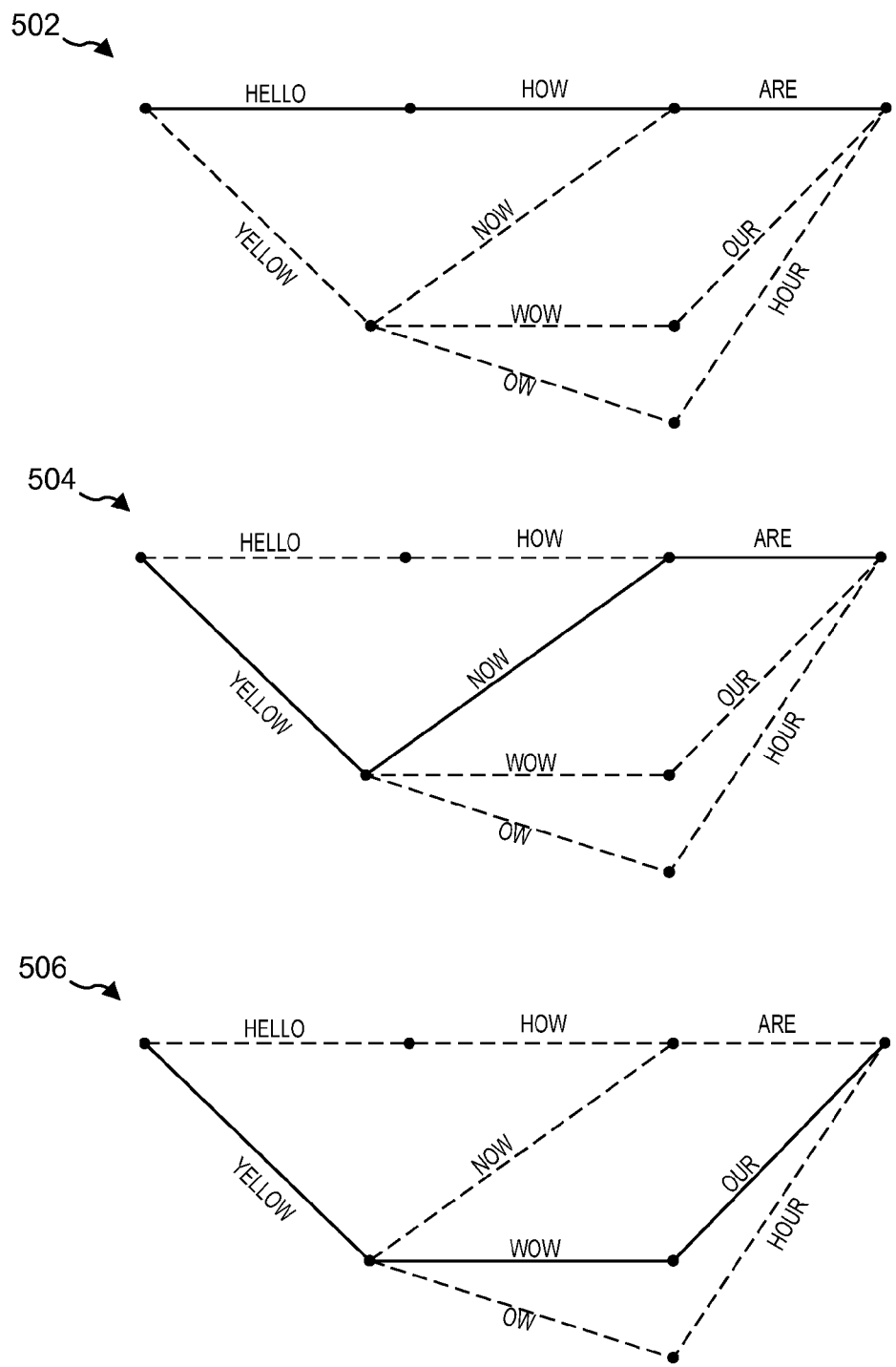
FIG. 5 illustrates speech recognition lattices according to one aspect of the present disclosure.
Figure 6:
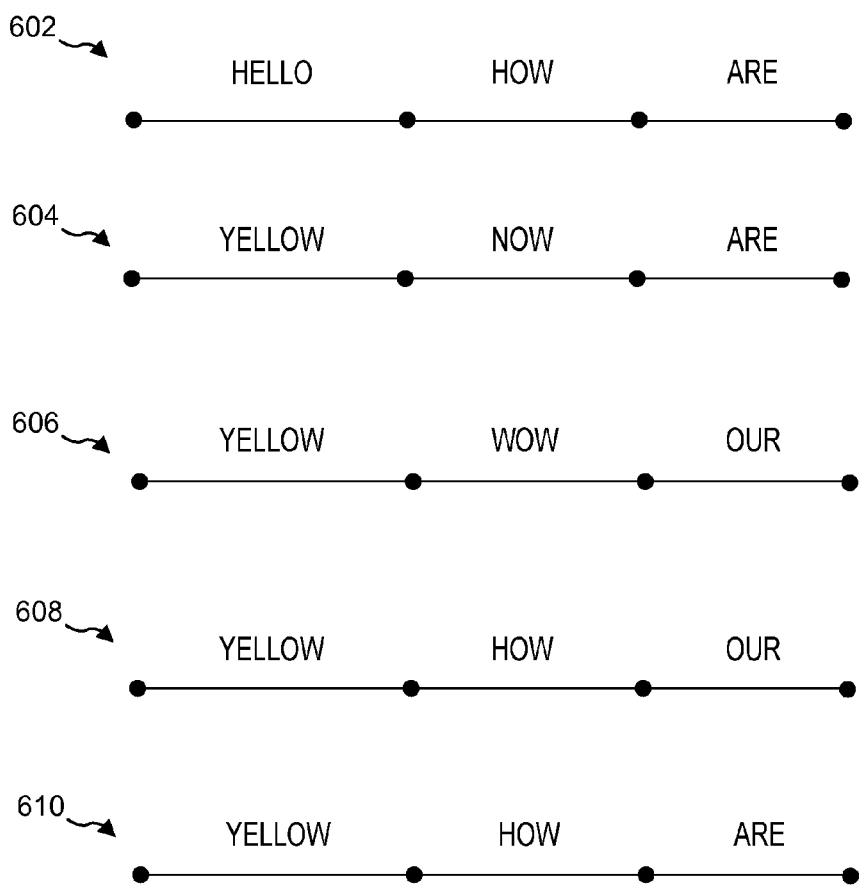
FIG. 6 illustrates a number of hypotheses associated with the lattice of FIG. 4.

Illustrated in FIG. 5 are different potential paths along the lattice 402. As shown in FIG. 5, path 502 results in "hello how are," path 504 results in "yellow now are" and path 506 results in "yellow wow our." As can be seen, many such paths are possible even in the small example lattice 402. An example of such paths 602-610 are shown in FIG. 6. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc.

Each hypotheses may include an end state which indicates the end of the utterance of the specific hypotheses. The end state is a state, for example an HMM state, used by the acoustic model and/or language model to indicate a particular hypothesis is complete. As the system traverses the lattice and considers potential hypotheses, the system considers whether the utterance has potentially reached an end state based on the confidence score of the particular hypothesis. The likelihood that the utterance has reached an end state thus may depend on the overall confidence of the particular hypothesis that may have reached an end state. The likelihood that the utterance has reached an end state thus may also depend, for example, on the individual words of the hypothesis and whether the speech continues. For example, "what is the weather" may be a complete utterance by itself, but it also may be followed by additional words, such as "in Seattle," "in January," "tomorrow," etc. This is illustrated in FIG. 7. All the utterances illustrated in FIG. 7 are example hypotheses that the system may be under active consideration after already recognizing the words "what is the weather." Many other examples are also possible. If no further words are recognized, the system may determine that an end state has been reached and may select 702 as the highest scoring utterance. However, additional words may cause the system to discard 702, and to instead consider the remaining hypotheses. Thus, as the system processes more words, individual hypotheses may become more or less likely (or drop out entirely to become an inactive hypothesis). And inversely, the longer a pause continues, the more likely the system will select a complete hypothesis at that moment and discard hypotheses that have not yet reached an end state. During traditional processing, it can be difficult to differentiate between the within-sentence pause and end-of sentence pause. For example, when speaking "what is the weather," a user may add additional information after some pause, like "what is the weather [Pause] in Seattle", or "What is the weather [Pause] in Seattle [Pause] tomorrow." In an HMM-based ASR system, the end-of sentence probability is modeled by the end states of the language model. For example, to determine an endpoint for a particular hypothesis, if an acoustic model has recognized a certain number of non-speech frames, a corresponding hypothesis may indicate an end state, assuming that the prior words of the hypothesis indicate a complete utterance.

An endpoint detector that uses the speech recognition engine 258 can take advantage of hypothesis information. As described in detail below, as the system progresses through a lattice, the likelihood that an endpoint has been reached may be determined by considering the overall pause duration and the active hypotheses that are under consideration by the ASR engine. As different hypotheses may correspond to different experienced pause durations (for example, as a result of specific hypotheses differing as to whether certain frames include speech or do not include speech) it may be desirable to consider pause duration across a plurality of active hypotheses.

The ASR module 250 may track a number of received audio frames that do not include speech, or do not include sufficient audio features to be considered speech. Such frames may be considered non-speech, or pause frames. A non-speech or pause frame may be determined by comparing the data from one or more feature vector(s) associated with the frame with one or more thresholds, to determine if the feature vector(s) represent audio likely to correspond to speech to be processed or likely to correspond to other audio such as noise, silence, background talking (i.e. speech not to be processed), etc. Thus a non-speech/pause frame is one in which the audio data of the respective frame is determined not to correspond to an utterance for ASR processing. Machine learning techniques may be used (such as those described herein) to train a model to determine when incoming audio data matches a non-speech/pause frame. Tracking of non-speech frames may be incorporated into processing by an acoustic model and/or language model, for example by adding node(s)/path(s) at the end of an active hypothesis where such node(s)/path(s) represent a certain duration of non-speech, for example one or more non-speech/pause frames. Such node(s)/path(s) may be considered non-speech node(s)/path(s), or pause node(s)/path(s). Such pause node(s)/path(s) may indicate a certain duration of audio that included a pause or non-speech. Such node(s)/path(s) may be differentiated from other node(s)/paths(s) which may also include other non-speech, such as semantic tags, state indicators, or other non-speech items.

Alternatively, or additionally, the ASR module 250 may run one or more counters, for example, one for each hypothesis, that counts a number of immediately preceding non-speech frames predicted by that hypothesis. The system may refer to such counters during processing to determine how much non-speech is associated with a particular hypothesis. The system may also refer to such counters when encountering a pause node(s)/path(s), particularly if the pause node(s)/path(s) does not track the duration of an ongoing pause. The counter will indicate to the system how long a pause has been ongoing. Upon predicting a frame that does include speech for processing, the counter for that particular hypothesis may be reset. Further, a phoneme path/node may be added to the hypothesis, such that the end of the hypothesis may no longer be a path and/or node associated with non-speech. As an example, if a first hypothesis predicts a non-speech frame, a counter associated with the first hypothesis may be set to one and/or a path/node may be added to the end of the first hypothesis indicating non-speech. If the first hypothesis predicts five more non-speech frames, the counter may be incremented each time until it ultimately reaches a value of six. Further, non-speech paths/non-speech nodes (i.e., paths or nodes indicting non-speech) may be added to the end of the first hypothesis indicating five more frames of non-speech. If the first hypothesis then predicts a frame including speech, the counter may be reset to zero and a phoneme path/node may be added to the end of the first hypothesis. Thus, at any particular point in speech processing, the system may either look at a particular counter to determine an amount of non-speech predicted by a hypothesis immediately prior to the particular point. The system may also count a number of non-speech paths/nodes immediately prior to the particular point in order to determine an amount of non-speech predicted by a hypothesis. Pause duration for a single hypothesis relative to a current point in ASR processing may also be calculated as the number of consecutive frames for which a hypothesis has been in a non-speech state immediately preceding the current point, or zero if the hypothesis is currently in a speech state. Other methods for determining/estimating non-speech predicted/seen for a particular hypothesis are also possible. Further, other metrics for duration of non-speech (beyond, for example, frames) may also be used.

The system may determine an endpoint based on non-speech as predicted by a hypothesis. For example, the system may determine that a single hypothesis (for example, a top scoring hypothesis) shows non-speech (for example, a certain amount of non-speech beyond a threshold) and therefore the system may declare an endpoint. However, it may also be desirable to make the endpointing decision based on the non-speech predicted by many different hypotheses, thereby smoothing any potential effects of outlier hypotheses. Thus, instead of basing an endpointing decision on a single pause duration of a single hypothesis, the system may determine an expected pause duration, which is an estimated pause duration as calculated by looking at multiple hypotheses and potentially weighting each respective pause duration based on the confidence associated with the respective hypothesis of each respective pause duration. To obtain an expected pause duration for an utterance across multiple hypotheses, the system may thus consider the probability or score of each individual hypothesis and weight the pause duration of each hypothesis using the hypothesis' respective probability. The system may then group all the weighted pause durations to determine an overall pause duration for the audio data under consideration. This overall pause duration may be referred to as the expected pause duration. Thus, by assigning a probability to a hypothesis and computing the weighted average of pause durations over active hypotheses, the system may derive the expected pause duration. The system may further define the expected pause duration at utterance end by calculating the expected pause duration only over hypotheses that are currently in a language model end state. As explained below, when the overall expected pause duration and/or expected pause duration for hypotheses at an end state are beyond certain threshold(s), the system may determine an endpoint, thus allowing the system to complete speech processing and return a recognition result for the entire utterance. Determination of the expected pause duration, the expected pause duration for hypotheses at an end state, and other endpointing may be performed, for example by an endpointing module 890 in communication with an ASR module 250.

As explained above, each audio frame, the ASR search space is expanded based on the given decoding graph/lattice, which includes both an acoustic model (AM) score and a language model (LM) score. The acoustic and language scores are accumulated along the decoding path for individual hypotheses. For present purposes, let $X_t = \{x_1, x_2, x_3, \ldots, x^t\}$ be the sequence of audio frames until time t (or audio frame) t and let $S_t^i = \{s_1^i, s_2^i, s_3^i, \ldots, s_t^i\}$, $i=[1, N_t]$ be the state sequence of the ith active hypothesis at time t. For any given time t, $N_t$ is the number of active hypotheses. The posterior (i.e., confidence) of the hypothesis can be presented as:

$$P(S_t^i \mid X_t) = \frac{P(s_t^i \mid x_t)}{P(s_t^i)} P(s_t^i \mid s_{t-1}^i) P(S_{t-1}^i \mid X_{t-1}) \quad \text{(Equation 1)}$$

where $P(s_t^i|x_t)/P(s_t^i)$ is the acoustic score using the posterior generated by the ASR module and normalized by the state prior. $P(s_t^i|s_{t-1}^i)$ is the multiplication of language model probabilities and HMM transition probabilities. $L_t^i$ denotes the pause duration for the i-th hypothesis. $L_t^i$ may be measured in frames or in time units (ms, etc.) $L_t^i$ may also be defined as the largest integer N such that $s_{t-N+1}^i \in$ $S_{NS} \wedge \ldots \wedge s_t^i \in S_{NS}$ holds, where $S_{NS}$ denotes the set of all non-speech states. Thus, if at time t−N, hypothesis i saw speech, then began seeing non-speech at time t−N+1. Thus, at time t (which is the time at which a determination is made), hypothesis i has been seeing non speech for N time units. The pause duration $L_t^i$ for a given hypothesis i can be derived from a traceback through the decoding graph kept by the decoder. The input label of each are in the decoding graph can be mapped to an HMM state representing a context dependent phone, and hence can be further mapped to the speech or non-speech case. A non-speech frame represents a pause and such frames may be cumulatively added to arrive at the pause duration $L_t^i$ for a particular hypothesis i at a particular time t. As noted above, once the hypothesis encounters a speech frame, L for that hypothesis may be reset to zero.

In one embodiment, the system may determine the experienced pause duration, $L_t^i$ for the top scoring language model (LM) hypothesis i=Top scoring LM hypothesis, thus calculating $L_t^{TOP}$. The system may declare an endpoint If $L_t^{TOP}$ exceeds a certain threshold, called $T_{end}$ and the top scoring LM hypothesis is in an end state ($S^{TOP} \in S_{end}$ or $s_t^{TOP} = S_{end}$). Thus, for making the endpoint decision the endpointing module 890 may consider only hypotheses being in a language model end state, and among these hypotheses the endpointing module may select the best scoring one. The endpointing module 890 determines an endpoint has been reached if the selected hypothesis is the overall best hypothesis as indicated in Equation 2 below and if the pause duration of the overall best hypothesis exceeds a threshold, as indicated in Equation 3 below.

$$\underset{i, s_t^i \in S_{end}}{\operatorname{argmax}} P(S_t^i \mid X_t) = \underset{i}{\operatorname{argmax}} P(S_t^i \mid X_t), \quad \text{(Equation 2)}$$

$$L_t^i > T_{end} \text{ with } i := \underset{i, s_t^i \in S_{end}}{\operatorname{argmax}} P(S_t^i \mid X_t), \quad \text{(Equation 3)}$$

The pause duration threshold $T_{end}$ may be tunable and thus configured to a value determined to achieve a certain desired system performance with regard to endpoint detection. Under certain conditions, an edge case may appear when the language model fails to correctly predict the end of the sentence. In that case the probability of the best non-sentence end hypothesis continuous to prevail and the endpoint detector doesn't trigger. This case can be solved by alternatively triggering detection of an endpoint if the pause duration of the overall top scoring (i.e., best) hypothesis exceeds a threshold, regardless of whether the top scoring hypothesis is in an end state. This alternative end state detection is described below in Equation 4.

$$L_t^i > T \text{ with } i := \underset{i}{\operatorname{argmax}} P(S_t^i \mid X_t), \quad \text{(Equation 4)}$$

where T is chosen such that $T > T_{end}$. The endpointing of Equations 2 and 3 may be used in conjunction with the endpointing of Equation 4, so that Equation 4 serves as a fallback to Equations 2 and 3, thus preventing a situation where the system never declares an endpoint when the language model never reaches an end state.

This described method of determining endpointing based on the top scoring hypothesis of a language model provides an effective approach to endpoint detection while considering the operation of the language model on the input utterance.

One difficulty with this approach, however, is that the above approach is dependent on what hypothesis is considered the top scoring hypothesis, and that the top scoring hypothesis may change rapidly between processed frames. For example, in an HMM based ASR decoder the language model may correct a particular hypothesis throughout operation of the speech processing engine 258. Further, optimization of the speech processing engine 258 may result in the language model score distribution along a particular path of the lattice taking the form of a non-smooth step function. Other factors such as noise, etc. may contribute to rapid switching between "top" hypotheses. To account for fluctuations between different hypotheses being the top scoring hypothesis, and corresponding complications to the endpointing system, the system may consider a plurality of active hypotheses to arrive at an expected pause based endpoint detection, as described below. Although the expected pause based endpoint detection below is described as using all active hypotheses, a subset of active hypotheses may also be considered, for example, active hypotheses above a certain score threshold, only a certain number of active hypotheses, etc. These variations are not expressly discussed below, but should be considered as part of the described method as an alternative to considering all active hypotheses as illustrated below.

As noted above, a speech recognition engine 258 may consider many active hypotheses when determining ASR output. For example, several thousand hypotheses may be active at any particular point during the ASR processing. Each particular hypothesis is associated with a score/probability P. Each particular hypothesis i also has some length of silence or non-speech $L_t^i$ detected at any particular point in time t, where L is a running tally of how much uninterrupted non-speech preceded time t for the particular hypothesis i. For example, L may be 5 frames of uninterrupted non-speech prior to time t, in which case L may be a value of 5 (or may be a value of 125 ms if 25 ms frames are used). In another example, L may be 0 if the most recent frame for a particular utterance was a frame that included speech. The system may consider the value of L for each active hypothesis, weighted by each hypothesis' respective probability, to arrive at an overall picture of the pause at a particular moment in time, the expected pause duration. Thus, the expected pause duration D at time t may be represented by a sum of pause durations $L_t^i$ across hypotheses i where each duration is multiplied by the normalized probability (i.e., posterior probability) $P(S_t^i \mid X_t)$ at time t for each hypotheses i at that particular state $S_t^i$ and audio frame $X_t$. The expected pause duration function is shown below in Equation 5.

$$\mathbb{D}(L_t) := \sum_i L_t^i P(S_t^i \mid X_t), \quad \text{(Equation 5)}$$

which can be interpreted as an expectation of the pause duration computed over all active decoding hypotheses. Smoothing the pause duration by considering the active hypotheses makes the value less sensitive to changes in the best decoding hypothesis. Thus the summed weighted pause durations of Equation 5 may provide a more robust determiner for pause duration of the input audio at time t. Because the cumulative probabilities of all hypotheses is typically below a known number (for example 1, 1000, or some other number depending on system configuration), and the individual probability of any particular hypothesis is under that known number, the expected pause duration D of Equation 5 may be considered a weighted average expected pause duration across active hypotheses.

While D of equation 5 illustrates the expected pause duration for active hypotheses under consideration, the system may also consider the expected pause duration at utterance end, that is calculating the expected pause duration but only for active hypotheses which have reached an end state in the language model. This expected duration, $D_{end}$ is illustrated in Equation 6.

$$\mathbb{D}_{end}(L_t) := \sum_{i, s_t^i \in S_{end}} L_t^i P(S_t^i \mid X_t) \quad \text{(Equation 6)}$$

The expected pause duration at utterance end $D_{end}$ of Equation 6 may be considered a weighted average expected pause duration across active hypotheses at an end state. As may be appreciated, $D \geq D_{end}$ as D includes active hypotheses but $D_{end}$ only includes active hypotheses are in an end state. For pauses in the middle of an utterance, the value of $D_{end}$ will remain small. But as the length of a pause in input audio increases, more active hypotheses under consideration will reach an end state, and the value of $D_{end}$ will converge to the value of D, thus reaching $D=D_{end}$ when all active hypotheses are in an end state.

Using the above equations, the endpointing module 890 may determine an endpoint if either of two situations occurs:
1. $\mathbb{D}_{end}(L_t) > T_{end}$ and $\mathbb{D}(L_t) > T'$, or
2. $\mathbb{D}(L_t) > T$ The first condition of situation 1 is that the expected pause duration at utterance end, $D_{end}$, has reached a certain threshold $T_{end}$. Thus, if the expected pause duration experienced by the number of active hypotheses at an end state crosses threshold $T_{end}$, then the first condition of situation 1 is met. The second condition of situation 1 is that the expected pause duration of active hypotheses (regardless of hypothesis state) has reached a certain threshold T'. Thus, if the expected pause duration experienced by all active hypotheses crosses threshold T', then the second condition of situation 1 is met. This second condition serves as a check on the first condition to avoid a mid-utterance pause accidentally resulting in an endpoint being triggered. Referring again to the examples discussed above in reference to FIG. 7, if the beginning of an utterance is "what is the weather [pause]", depending on the pause length a number of hypotheses may not yet have reached an end state. The second condition safeguards against prematurely declaring an endpoint in response to a mid-utterance pause, which may result when a language model fails to correctly predict the end of an utterance. If both the first condition and second condition of situation 1 are met, then an endpoint may be declared. Alternatively, the system may declare an endpoint if only the first condition of situation 1 is met or if the second condition of situation 1 is met, but it may be preferable to declare an endpoint when both conditions of situation 1 are met.

Condition 2 acts as an endpointing safety valve, similar to that discussed above with reference to endpointing based on the best hypothesis. If the speech recognition engine 258 encounters errors, the system does not want to experience a loop where endpointing never occurs. Thus, a safety threshold T may be configured so that if all active hypotheses crosses threshold T, an endpoint is declared. While the values of T, T', and $T_{end}$ are configurable to arrive at a desired system performance, it can be appreciated that T is larger than and T' and $T_{end}$ in order for T to serve as the safety threshold. The various threshold values may be optimized over a development training data set using machine learning techniques discussed above. Further, while the above techniques may be used with existing language models, during training of language models, language models may be optimized to carefully select end states within hypotheses. For example, a training set of utterances with known end points may be used and the language model may be trained to minimize a cost function of missing the end point. Other such training configurations are also possible.

The above language model based endpointing techniques may be combined with other endpointing techniques, for example VAD techniques. As an example, during processing of a beginning of an utterance, a system may experience false endpointing triggers. To account for this, during onset of speech processing (that is, for a certain duration of time) the system may use VAD techniques to check for an endpoint, and may switch to a language model technique such as described above after the duration passes.

Another endpointing mechanism may use multiple machine learning techniques described above. For example, a classifier (such as an SVM) or other model may be trained to determine an end point based on both the pause of the best hypothesis and the expected pause duration across multiple active hypotheses (including, potentially, active hypotheses at an end state). The classifier may be trained using a number of support vectors with a number of different training utterances/end points representing audio data, pause durations, etc.

Figure 8:
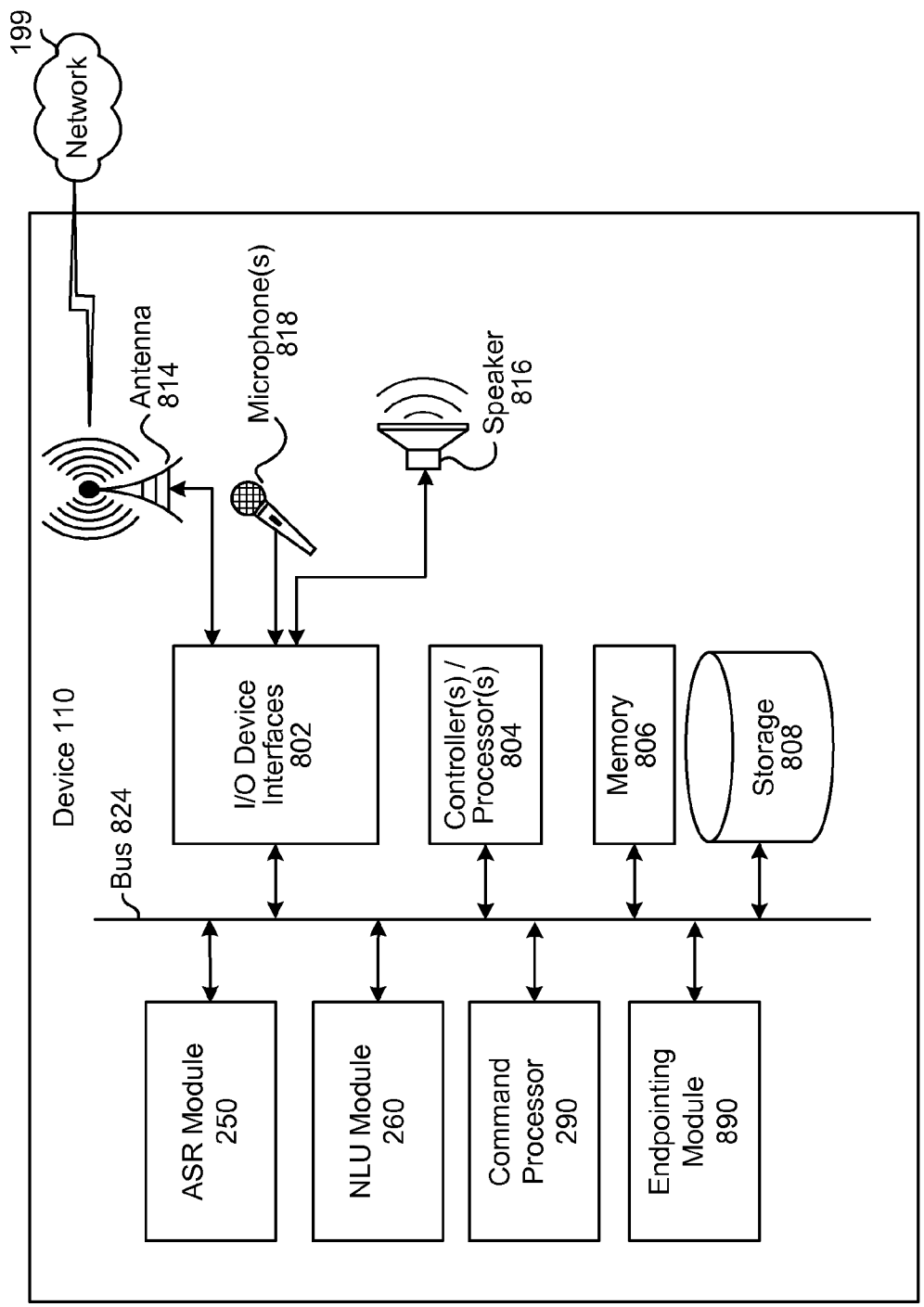
FIG. 8 is a block diagram conceptually illustrating example components of a device according to embodiments of the present disclosure.
Figure 9:
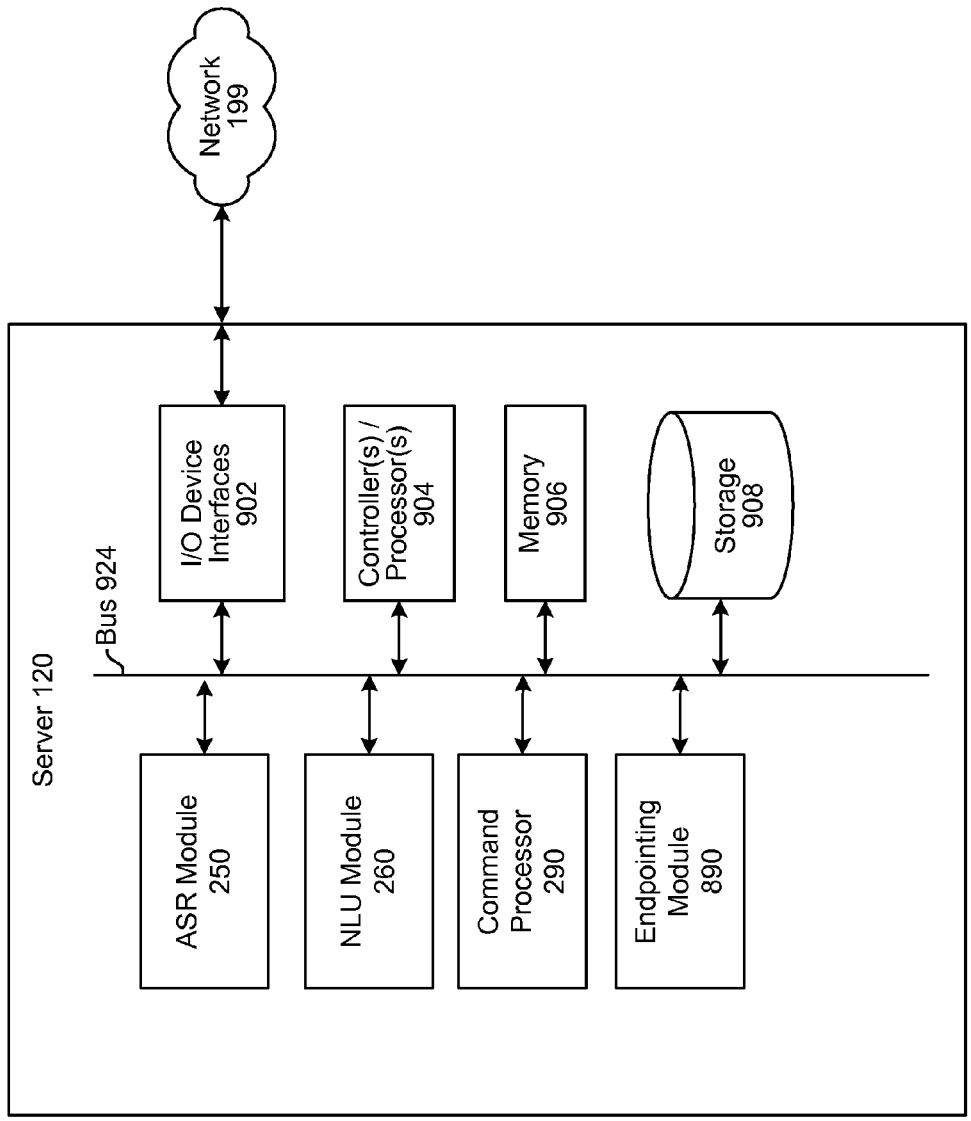
FIG. 9 is a block diagram conceptually illustrating example components of a server according to embodiments of the present disclosure.

FIG. 8 is a block diagram conceptually illustrating a local device 110 that may incorporate certain speech receiving/processing capabilities. FIG. 9 is a block diagram conceptually illustrating example components of a remote device, such as a remote server 120 that may assist with ASR and/or NLU processing. Multiple such remote devices may be included in the system, such as one remote device for ASR, one remote device for NLU, etc. In operation, each of these devices may include computer-readable and computer-executable instructions that reside on the respective device (110/120), as will be discussed further below.

Each of these devices (110/120) may include one or more controllers/processors (804/904), that may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive (MRAM) and/or other types of memory. Each device may also include a data storage component (808/908), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (802/902).

Computer instructions for operating each device (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120) includes input/output device interfaces (802/902). A variety of components may be connected through the input/output device interfaces, as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to the speech-controlled appliance 110 in FIG. 8, the input/output device interfaces 802 connect to a variety of components such as a microphone 818 or microphone array, a speaker or speaker(s) 816, an one or more antennas 814 supporting wireless communication. Via the antenna(s), the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device may include an ASR module 250. The storage 808 may include ASR models 252 used by the ASR module 250. The ASR module 250 may be configured to identify a limited number of words, such as wake words of the device, or may be configured to perform extended speech recognition to recognize a much larger range of words. The device may also include a limited or extended NLU module 260 that may include certain NLU functions or may include expanded NLU functionality, such as described above in reference to NLU module 260. Storage 808 may also include an NLU knowledge base 272 and/or entity library 282. The device may also include an endpointing module 890 to perform endpointing using hypotheses as described above. The device may also include a command processor 290 for further execution of spoken commands.

As illustrated in FIG. 9, one or more servers 120 may include the ASR module 250, the NLU module 260, endpointing module 890 and/or a command processor 290. The command processor 290 may be configured to execute commands associate with an utterance.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 8 and 9, are exemplary, and may be located a stand-alone device or may be included, in whole or in part, as a component of a larger device or system.

Figure 10:
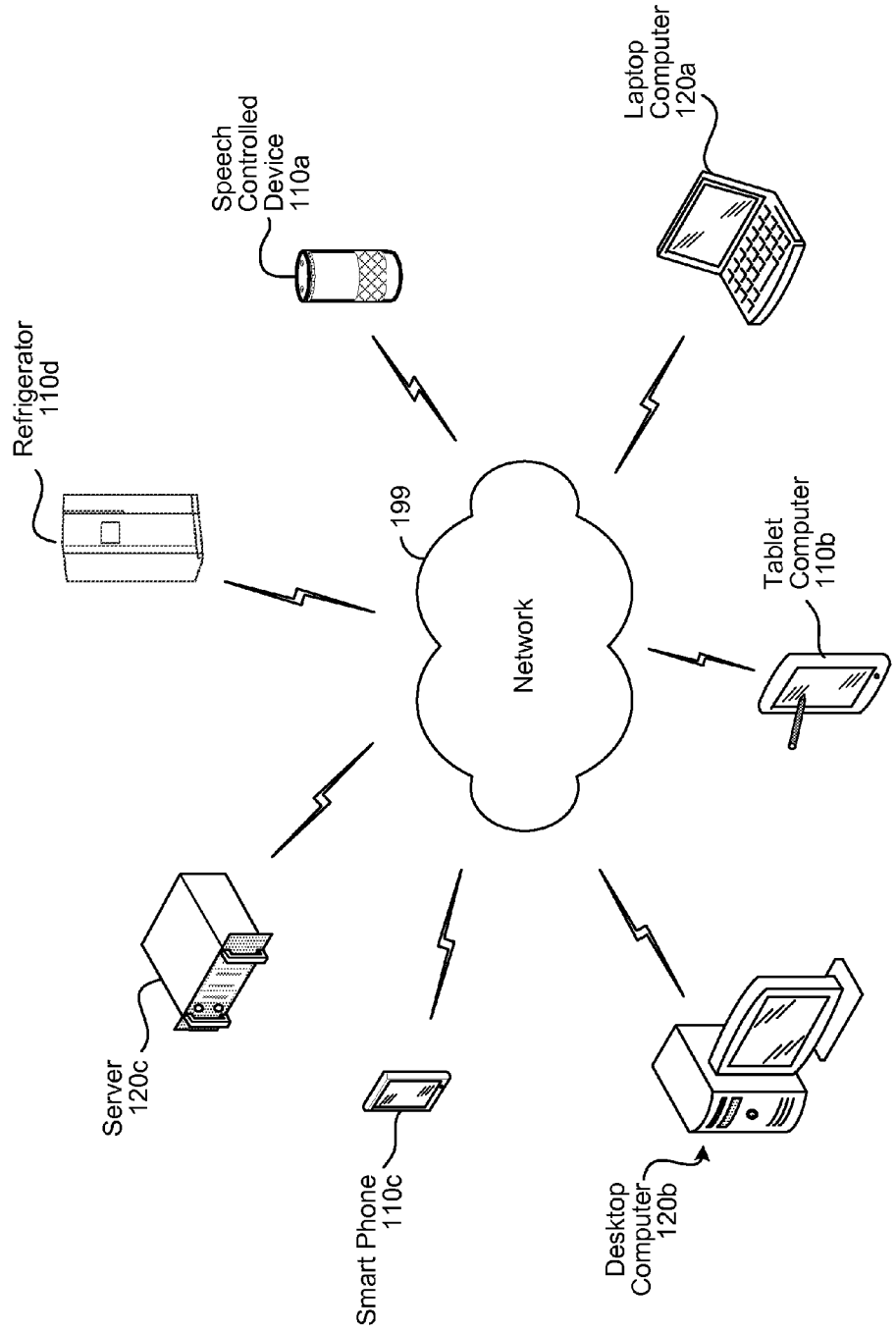
FIG. 10 illustrates an example of a computer network for use with the system.

As illustrated in FIG. 10, multiple devices (110a-110d and 120a-120c) may contain components of the system 100 and the devices may be connected over a network 199. The network 199 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 199 through either wired or wireless connections. Network 199 may include a local or private network or may include a wide network such as the internet. For example, a speech controlled device 110a, a tablet computer 110b, a smart phone 110c, and a refrigerator 110d may be connected to the network 199 through a wireless service provider, over a WiFi or cellular network connection or the like. Other devices are included as network-connected support devices, such as laptop computer 120a, desktop computer 120b, and a server 120c. The support devices 120 may connect to the network 199 through a wired connection or wireless connection. Networked devices 110 may capture audio using one-or-more built-in or connected microphones 818 or audio capture devices, with processing performed by ASR, NLU, or other components of the same device or another device connected via network 199, such as an ASR 250, NLU 260, etc. of one or more servers 120c.

The concepts disclosed herein may be applied within a number of different devices and computer systems, including, for example, general-purpose computing systems, speech processing systems, and distributed computing environments. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for determining an endpoint during automatic speech recognition (ASR) processing, the method comprising:
   receiving audio data representing speech detected using a microphone of a mobile device;
   performing ASR processing on the audio data to determine a plurality of hypotheses;
   determining, for each of the plurality of hypotheses, a respective probability that the respective hypothesis corresponds to the audio data;
   determining, for each of the plurality of hypotheses, a respective number of non-speech audio frames immediately preceding a first point in the audio data;
   determining, for each of the plurality of hypotheses, a respective score by multiplying the probability of the respective hypothesis by a factor corresponding to the number of non-speech audio frames of the respective hypothesis;
   determining a cumulative score by summing the respective scores for each of the plurality of hypotheses;
   determining that the cumulative score exceeds a first threshold; and
   designating the first point as corresponding to a likely endpoint as a result of the cumulative score exceeding the first threshold.

2. The computer-implemented method of claim 1, further comprising:
   determining a second plurality of hypotheses, wherein:
      the second plurality of hypotheses is a subset of the plurality of hypotheses, and
      each of the second plurality of hypotheses is at a respective end state;
   determining a second score by summing the respective score for each of the second plurality of hypotheses; and
   determining that the second score exceeds a second threshold.

3. The computer-implemented method of claim 1, wherein determining the respective number of non-speech audio frames for each respective hypothesis comprises determining, for each hypothesis, a number of consecutive non-speech nodes immediately prior to the first point.

4. The computer-implemented method of claim 1, wherein determining the respective number of non-speech audio frames for each respective hypothesis comprises maintaining a counter, for each hypothesis, of a number of consecutive non-speech frames immediately prior to the first point.

5. A computer-implemented method, comprising:
   receiving audio data;
   performing speech recognition processing on the audio data to determine a plurality of hypotheses, each hypothesis of the plurality comprising at least one of a representation of a respective subword unit or a representation of a respective word, wherein the plurality of hypotheses includes:
      a first hypothesis comprising a first representation of first non-speech preceding a first point in the audio data, and
      a second hypothesis comprising a second representation of second non-speech preceding the first point in the audio data;
   determining a first probability corresponding to the first hypothesis;
   determining a second probability corresponding to the second hypothesis;
   determining a first weighted duration value by using the first probability to adjust a first value representing a first time duration of the first non-speech;
   determining a second weighted duration value by using the second probability to adjust a second value representing a second time duration of the second non-speech;
   combining at least the first weighted duration value and the second weighted duration value to determine a third value representing an expected non-speech time duration preceding the first point in the audio data;
   determining that the third value exceeds a threshold duration value; and
   determining, based at least in part on determining that the third value exceeds the threshold duration value, that an endpoint of speech occurs at the first point in the audio data.

6. The computer-implemented method of claim 5, wherein:
   using the first probability to adjust the first value comprises multiplying the first value by the first probability;
   using the second probability to adjust the second value comprises multiplying the second value by the second probability, and
   combining the first weighted duration value and the second weighted duration value comprises summing the first weighted duration value and the second weighted duration value.

7. The computer-implemented method of claim 5, further comprising:
   determining that the first hypothesis comprises a first indication of an end state; and
   determining that the second hypothesis comprises a second indication of an end state.

8. The computer-implemented method of claim 5, further comprising:

determining the first time duration by determining a number of consecutive non-speech audio frames corresponding to the first representation of the first non-speech.

9. The computer-implemented method of claim 8, wherein determining the number of consecutive non-speech audio frames further comprises maintaining a counter of the number of consecutive non-speech audio frames corresponding to the first representation of the first non-speech.

10. The computer-implemented method of claim 8, wherein determining the number of consecutive non-speech audio frames further comprises determining a number of consecutive non-speech nodes represented in the first hypothesis.

11. A computing system, comprising:
at least one processor;
a memory including instructions operable to be executed by the at least one processor to cause the computing system to perform a set of actions comprising:
receiving audio data;
performing speech recognition processing on the audio data to determine a plurality of hypotheses, each hypothesis of the plurality comprising at least one of a representation of a respective subword unit or a representation of a respective word, wherein the plurality of hypotheses includes:
a first hypothesis comprising a first representation of first non-speech preceding a first point in the audio data, and
a second hypothesis comprising a second representation of second non-speech preceding the first point in the audio data;
determining a first probability corresponding to the first hypothesis;
determining a second probability corresponding to the second hypothesis;
determining a first weighted duration value by using the first probability to adjust a first value representing a first time duration of the first non-speech;
determining a second weighted duration value by using the second probability to adjust a second value representing a second time duration of the second non-speech;
combining at least the first weighted duration value and the second weighted duration value to determine a third value representing an expected non-speech time duration preceding the first point in the audio data;
determining that the third value exceeds a threshold duration value; and
determining, based at least in part on determining that the third value exceeds the threshold duration value, that an endpoint of speech occurs at the first point in the audio data.

12. The computing system of claim 11, wherein:
using the first probability to adjust the first value comprises multiplying the first value by the first probability;
using the second probability to adjust the second value comprises multiplying the second value by the second probability, and
combining the first weighted duration value and the second weighted duration value comprises summing the first weighted duration value and the second weighted duration value.

13. The computing system of claim 11, wherein the memory includes additional instructions operable to be executed by the at least one processor to further cause the computing system to perform additional actions comprising:
determining that the first hypothesis comprises a first indication of an end state; and
determining that the second hypothesis comprises a second indication of an end state.

14. The computing system of claim 11, wherein the memory includes additional instructions operable to be executed by the at least one processor to further cause the computing system to perform additional actions comprising:
determining the first time duration by determining a number of consecutive non-speech audio frames corresponding to the first representation of the first non-speech.

15. The computing system of claim 14, wherein determining the number of consecutive non-speech audio frames further comprises maintaining a counter of the number of consecutive non-speech audio frames corresponding to the first representation of the first non-speech.

16. The computing system of claim 14, wherein determining the number of consecutive non-speech audio frames further comprises determining a number of consecutive non-speech nodes represented in the first hypothesis.

17. The computer-implemented method of claim 7, further comprising:
determining the first time duration by determining a number of consecutive non-speech audio frames corresponding to the first representation of the first duration of non-speech.

18. The computer-implemented method of claim 17, wherein determining the number of consecutive non-speech audio frames further comprises maintaining a counter of the number of consecutive non-speech audio frames corresponding to the first representation of the first non-speech.

19. The computer-implemented method of claim 17, wherein determining the number of non-speech audio frames further comprises determining a number of consecutive non-speech nodes represented in the first hypothesis.

20. The computing system of claim 13, wherein the memory includes additional instructions operable to be executed by the at least one processor to further cause the computing system to perform additional actions comprising:
determining the first time duration by determining a number of consecutive non-speech audio frames corresponding to the first representation of the first non-speech.

21. The computing system of claim 20, wherein determining the number of consecutive non-speech audio frames further comprises maintaining a counter of the number of consecutive non-speech audio frames corresponding to the first representation of the first non-speech.

22. The computing system of claim 20, wherein determining the number of consecutive non-speech audio frames further comprises determining a number of consecutive non-speech nodes represented in the first hypothesis.

* * * * *